Aug. 21, 1951   J. H. DEVINE ET AL   2,564,834
RECEPTACLE AND COVER THEREFOR
Filed Nov. 23, 1946   2 Sheets-Sheet 1
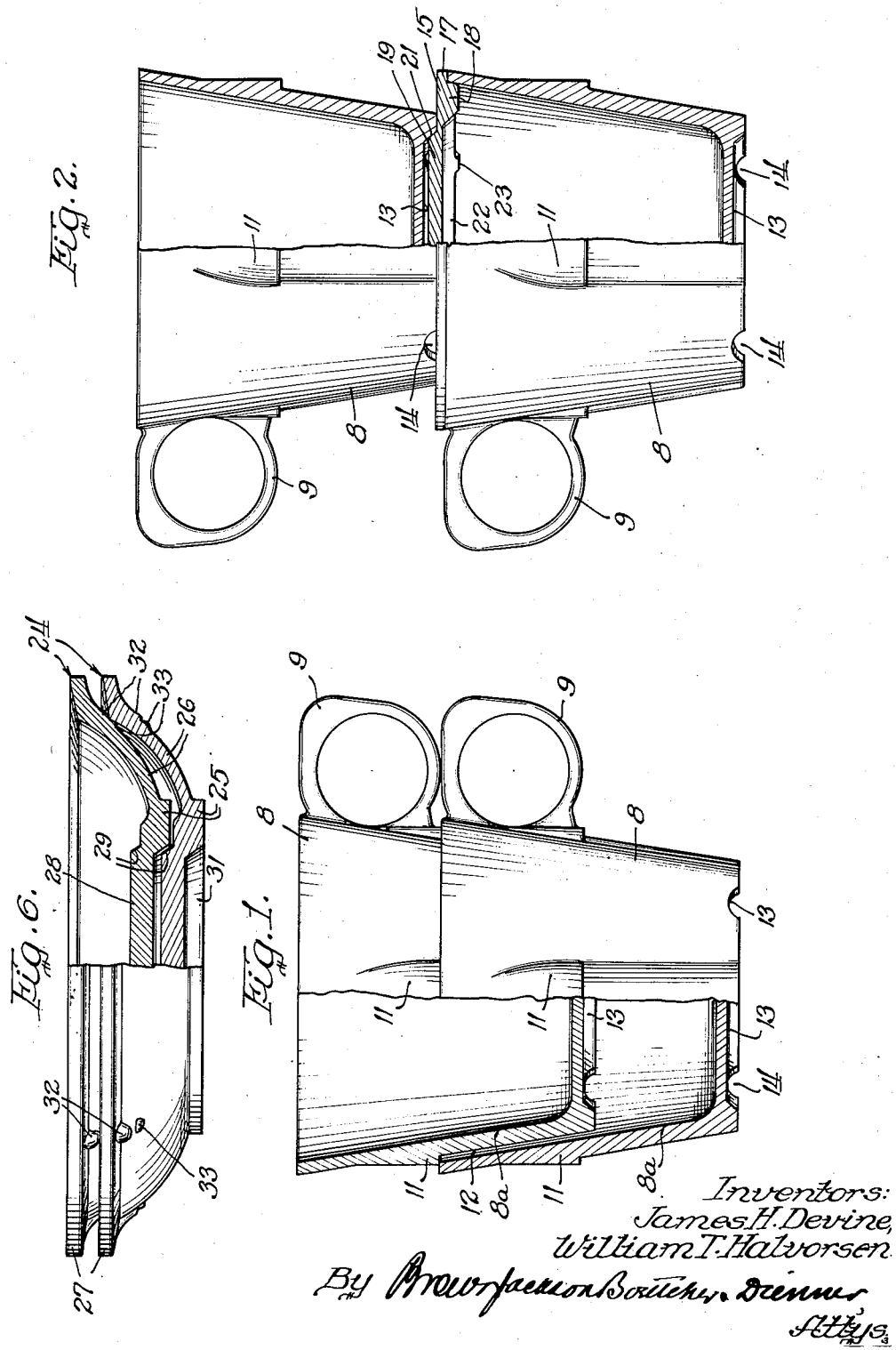
Inventors:
James H. Devine,
William T. Halvorsen

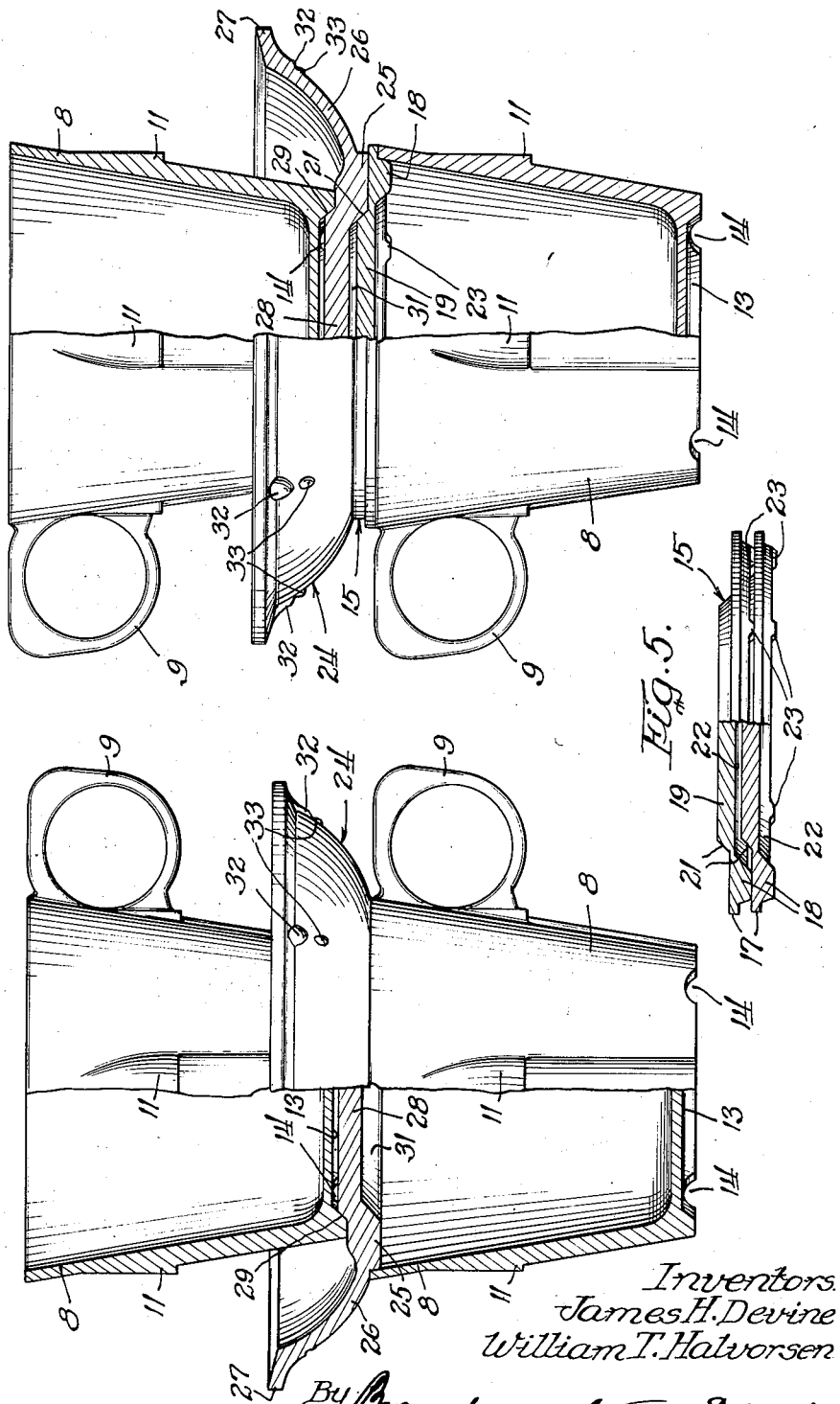

Patented Aug. 21, 1951

2,564,834

UNITED STATES PATENT OFFICE 2,564,834

RECEPTACLE AND COVER THEREFOR

James H. Devine and William T. Halvorsen, Chicago, Ill.

Application November 23, 1946, Serial No. 712,028

1 Claim. (Cl. 65—15)

This invention relates to receptacles and covers therefor, and other allied articles.

The invention contemplates the provision of a new and improved form of receptacle and cover therefor so constructed that one receptacle may be nested or stacked one within another receptacle; the covers seated one upon another; and one receptacle seated upon the cover of a lower receptacle. Where the receptacle is in the form of a cup, a saucer may be provided therefor, the saucers being capable of being stacked one upon another, or one saucer being capable of seating on the cover of a lower cup, or seating on the open rim of a lower receptacle. Particularly, the invention contemplates the provision of means for preventing or restraining lateral movement between the stacked covers, the stacked saucers or between a receptacle seated upon a lower cover or saucer.

The receptacles may be of any desired shape, cylindrical, square, oval or rectangular. They may be in the form of cups, tumblers, platters, bowls, plates, etc. Each has generally tapered side walls in order that a plurality of them may be nested together. Each receptacle is provided with circumferentially spaced apart shoulders on its side wall so that when the receptacles are nested together the shoulders of one receptacle seat on the open rim of a lower receptacle, whereby to limit inward movement of the receptacles with respect to each other, and thereby obviate wedging of the receptacles together.

The covers are substantially uniform in dimensions and may be used interchangeably with any receptacle. Likewise, the saucers are uniform in dimensions and may be used interchangeably with any receptacle. The receptacles are provided with a circular recess in the bottom wall thereof. When a receptacle is stacked on a cover or saucer, a shoulder on the cover or saucer engages in the recess in the bottom wall of the receptacle seating on that cover or saucer. The walls defining the recess and shoulder are correspondingly tapered for that purpose. In forming the shoulder on the covers and saucers, a recess is also formed in the opposite face thereof. In the case of the covers, this permits stacking of the covers with the shoulder of one cover engaging in the recess of the cover seating thereon. In the case of the saucers, a cover may be placed on the receptacle and a saucer seated thereon, the shoulder on the cover engaging in the recess in the saucer. Both the cover and saucers have depending annular shoulders for engaging within the open end of the receptacle. This restrains lateral movement of the saucers and covers with respect to the receptacle, as does the engagement of the shoulders and recesses of the saucers and covers with each other, and with the recess in the bottom well of the receptacle.

It has been noted that with the interengagement of the shoulders and recesses of the various articles above referred to, that heating and subsequent cooling of the articles tends to develop a vacuum, which at times requires forcible separation of the articles from each other. To obviate this undesirable characteristic, the shoulders on the receptacles are preferably discontinuous, circumferentially spaced apart shoulders, which provide for an air-space between the outer wall of one receptacle and the inner wall of the receptacle in which it is nested. This assures free circulation of air between the receptacle and eliminates the formation of any vacuum. To the same end, the depending shoulder of the covers and the portion of the saucers between the rim thereof and the depending shoulder, each have a plurality of spaced apart legs for seating on the cover or saucers therebelow when the same are stacked. The receptacles have the wall thereof defining the recess formed with arcuate shaped portions. The purpose of these arcuate shaped portions will hereinafter appear.

Further features and advantages of the invention will appear from the following detailed description when taken in connection with the accompanying drawings, in which:

Figure 1 is a view, partly in vertical section and partly in front elevation, showing a pair of cups embodying the principles of the present invention, and illustrating the stacking arrangement thereof;

Figure 2 is a view similar to Figure 1, illustrating the stacking arrangement of the cups and covers;

Figure 3 is a view similar to Figure 1, illustrating the stacking arrangement of the cups and saucers;

Figure 4 is a view similar to Figure 1, illustrating the stacking arrangement of the cups, saucers, and covers;

Figure 5 is a view similar to Figure 1, illustrating the stacking arrangement of the covers, and Figure 6 is a view similar to Figure 1, illustrating the stacking of the saucers.

Referring now in detail to the drawings, it will be noted that the receptacles chosen for purposes of illustration are generally cylindrical in shape, although they may be of rectangular, oval or square shape. In general, they are in the nature of cups, tumblers, saucers, plates, bowls, platters, etc. The receptacles are preferably constructed from a synthetic resin material, although any other suitable or preferred material may be employed.

The receptacles shown in Figure 1 comprise a cup 8 having a handle 9. Elimination of handle 9 from cup 8 would, in effect, change the cup to a tumbler. The side wall 8a of the cup or tumbler is preferably tapered downwardly to permit of one cup being nested in another cup as shown. Substantially midway between the opposite ends of the cup, there are formed integral shoulders 11, which shoulders are preferably of the upwardly tapered form shown. The shoulders are circumferentially spaced apart about the side wall 8a. Three shoulders are employed, although a greater number may be provided, if desired. The position of the lower end of the shoulders is substantially on, or slightly below, a line with the lower surface of the handle 9. When the cups are nested, as shown, the shoulder of the upper cup contacts the rim of the lower cup and limits the movement of the former into the latter. The shoulders additionally provide for an air space between the two cups. No vacuum will be formed. In fact, if the cups are stacked in reverse to the position shown in Figure 1, that is, stacked upside down, the water remaining in the cups after being washed may be allowed to drain out through a space. It will also be noted that the particular disposition of the shoulders on the cups, prevents the handles of an upper cup from contacting the rim of a lower cup, which would result in tilting of the cups with respect to each other, as is the case with ordinary tea cups. The cups or tumblers may be nested to any desired height. And, without the possibility of the lowermost cups becoming wedged together by the weight of the upper cups. Moreover, by reason of the air space therebetween, no vacuum will develop between the cups and no forcible separation of the cups will be required. A circular recess 13 is formed in the bottom wall of the cups or tumblers and, as will be noted, is of appreciable diameter. The wall defining the recess 13 is provided with the arcuate shaped notches 14 for a purpose that will hereinafter appear. The depth of these notches is such that when the cups are stacked upside down, the water will drain from recess 13.

Cover 15 is also preferably formed of a synthetic resin material and is substantially disk shaped, being provided with the outwardly extending annular flange 17 for seating on the peripheral upper edge of a cup or tumbler. The depending annular shoulder 18, of course, enters the open end of the cup or tumbler and engages the side wall thereof to restrain lateral movement of the cover with respect to the cup. Centrally, the cover is provided with the circular upwardly projected portion 19 forming the annular shoulder 21, and on its opposite face with the circular recess 22. The shoulder 21 and the wall defining recess 13 of the cup are correspondingly tapered, as is likewise shoulder 21 and the wall defining recess 22 in the cover. The under surface of depending shoulder 18 has a plurality of spaced apart protuberances 23 for a purpose that will hereinafter appear.

The saucer 24 as shown, for example, in Figure 6 comprises the depending annular flange 25, the curved side wall 26 and the horizontally disposed annular flange 27. The saucer, like the cover 15, is also provided with the upwardly projected circular portion 28 forming the shoulder 29, and on its under side the circular recess 31. The shoulder 29 and the wall defining recess 31 are correspondingly tapered, and this taper corresponds to the taper of the wall defining the recess 13 in cup or tumbler 8. Immediately adjacent flange 27 on curved wall 26 and spaced circumferentially therearound, are pairs of radially arranged protuberances 32 and 33. The purposes of these protuberances will later appear.

Figure 1 illustrates the manner of nesting or stacking the cups in the manner hereinbefore described. Tumblers and bowls of square, oval or circular shape may similarly be constructed and nested.

Figure 2 illustrates the stacking of the covers and cups. These covers and cups may be stacked, as shown, to any desired height. The engagement of shoulder 18 in cup 8 restrains lateral movement of the cover with respect to the cup, as does the engagement of shoulder 21 of the cover into recess 13 of the cup restrain lateral movement between the two. The notches 14 permit the ingress of air to prevent the formation of any vacuum between the cup and cover.

Figure 3 illustrates the stacking of the cups and saucers, which may be done to any desired height. The engagement of shoulder 29 in the recess 13 of upper cup 8 restrains lateral movement of the cups and saucers with respect to each other. The notches 14 prevent the formation of a vacuum between the cup and saucer, assuring that the saucer will not be lifted with the cup.

Figure 4 illustrates the stacking of a cup, cover, saucer and cup, which likewise may be done to any desired height. As noted before, the interengagement of the shoulders and recesses of the various articles restrain lateral movement therebetween.

In Figure 5 there is shown the nesting or stacking arrangement of the covers. The shoulder 21 of the lower cover engages in the recess 22 of the upper cover to restrain lateral movement therebetween. The depending protuberances 23 on the upper cover seat on the upper surface of the lower cover and prevent the covers from becoming wedged together by reason of the interengaging shoulder and recess. The spacing of the covers apart by the protuberances permits the ingress of air therebetween so that no vacuum will be formed, which would require forceable separation of the covers.

The stacking of the saucers is illustrated in Figure 6. The protuberances 32 of the upper saucer seat on the horizontal flange 27 of the lower saucer and the protuberance 33 of the upper saucer abut the curved side wall of the lower saucer. The protuberances 32 permit ingress of air between the saucers so no vacuum will form, while the protuberances 33 restrain lateral movement of the saucers with respect to each other.

While preferred embodiments of the invention have been illustrated and described by way of example, it will be obvious that changes may be made therein within the spirit and scope of the invention and, therefore, the invention is not to be limited to the precise forms herein disclosed, except insofar as they may so be limited by the appended claim.

We claim:

A receptacle of the class described comprising a curved side wall and a horizontal flange extending therefrom, a bottom wall having an outwardly pressed central portion extending from one face thereof and a corresponding recess formed in the other face thereof, and a plurality of pairs of radially spaced apart protuberances formed on the outer surface of said curved wall, whereby one saucer may be stacked upon another with one of the pairs of protuberances seating on the flange of a saucer therebelow and the other of the pair of protuberances contacting the curved wall thereof.

JAMES H. DEVINE.
WILLIAM T. HALVORSEN.

REFERENCES CITED

The following references are of record in the file of this patent:

UNITED STATES PATENTS

| Number | Name | Date |
|---|---|---|
| Re. 18,942 | Morris | Sept. 12, 1933 |
| D. 22,780 | Hache | Sept. 12, 1893 |
| D. 37,408 | Straus | Apr. 18, 1905 |
| 117,766 | Gibson, Jr. | Aug. 8, 1871 |
| 519,417 | York | May 8, 1894 |
| 763,962 | Clayton et al. | July 5, 1904 |
| 797,314 | Owens | Aug. 15, 1905 |
| 893,469 | Essmuller | July 14, 1908 |
| 1,022,882 | Schwenn | Apr. 9, 1912 |
| 1,187,899 | Gardam | June 20, 1916 |
| 1,199,603 | Parsons | Sept. 26, 1916 |
| 1,238,092 | Blass | Aug. 28, 1917 |
| 1,468,748 | Schuman | Sept. 25, 1923 |
| 1,509,524 | Morrison | Sept. 23, 1924 |
| 1,595,618 | Radford | Aug. 10, 1926 |
| 1,635,918 | Alaj | July 12, 1927 |
| 1,666,389 | Mander | Apr. 17, 1928 |
| 1,703,453 | Parker | Feb. 26, 1929 |
| 1,717,974 | Heinrichs | June 18, 1929 |
| 1,944,827 | Osherman et al. | Jan. 23, 1934 |
| 1,953,765 | McCluney | Apr. 3, 1934 |
| 1,978,175 | Stalle | Oct. 23, 1934 |
| 2,041,563 | Meinecke | May 19, 1936 |
| 2,080,283 | Lowenfels | May 11, 1937 |
| 2,141,013 | Nicholson | Dec. 20, 1938 |
| 2,210,283 | Cowan | Aug. 6, 1940 |
| 2,239,093 | Giller | Apr. 22, 1941 |
| 2,298,814 | Weis | Oct. 13, 1942 |
| 2,412,325 | Devine et al. | Dec. 10, 1946 |
| 2,479,765 | Mower | Aug. 23, 1949 |

FOREIGN PATENTS

| Number | Country | Date |
|---|---|---|
| 296,544 | Great Britain | Sept. 6, 1928 |